UNITED STATES PATENT OFFICE.

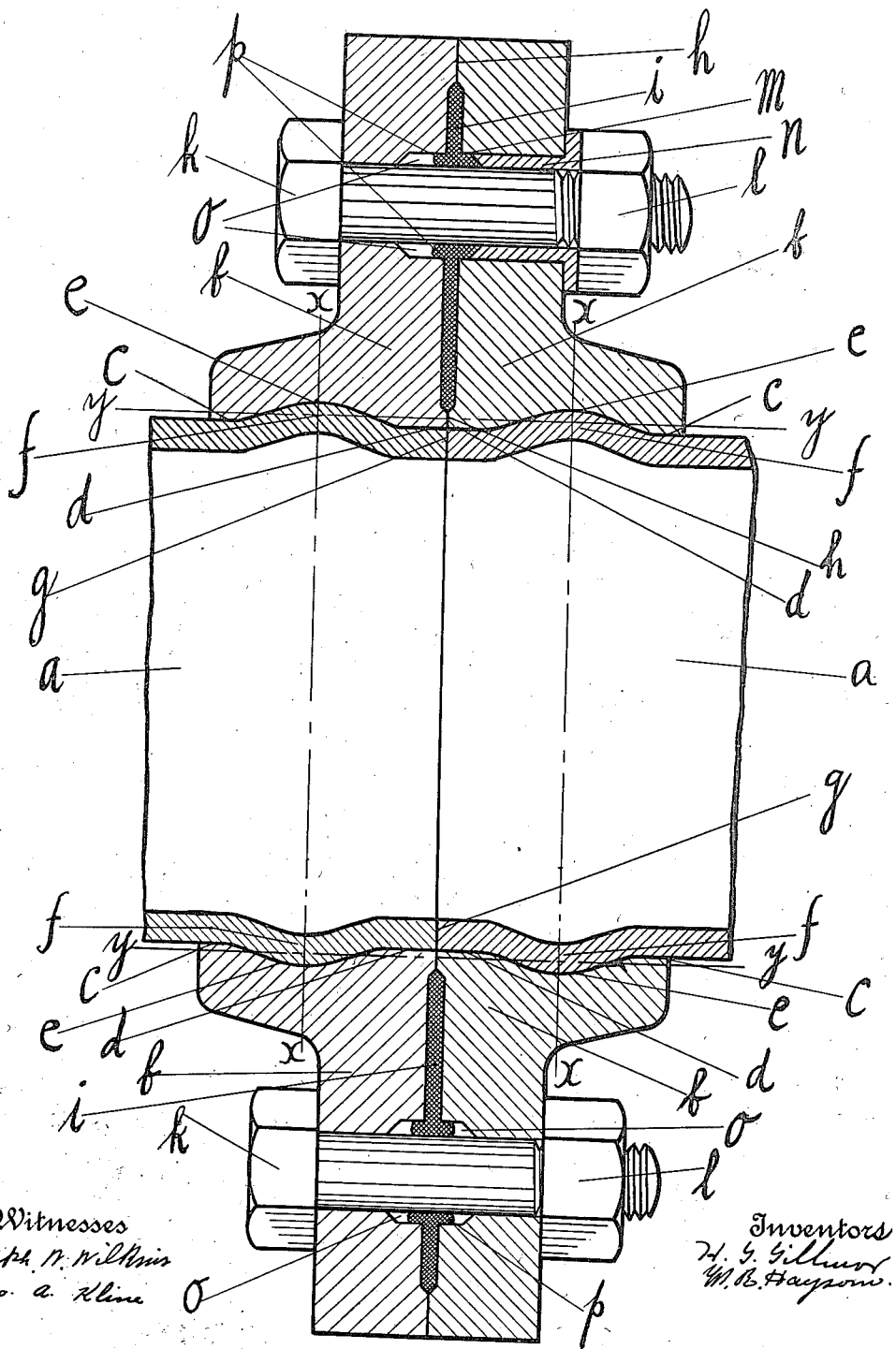

HORATIO G. GILLMOR AND WILLIAM R. HAYSOM, OF QUINCY, MASSACHUSETTS.

PIPE-JOINT.

1,045,389.  Specification of Letters Patent.  Patented Nov. 26, 1912.

Application filed January 6, 1908. Serial No. 409,487.

*To all whom it may concern:*

Be it known that we, HORATIO G. GILLMOR and WILLIAM R. HAYSOM, citizens of the United States, residing at Quincy, county of Norfolk, State of Massachusetts, have invented new and useful Improvements in Pipe-Joints, of which the following is a specification.

Our invention relates to pipe joints, and one of the objects of the invention is to produce a joint which shall be perfectly tight at high pressures and high temperatures.

Another object is to provide for securing the joint flanges to the pipe without reducing the strength of the pipe at the joint and insure that the plane of the face of the flange shall be at right angles to the axis of the pipe.

Other objects of the invention are to produce a joint in which the edges of the packing are protected and in which a metallic packing may be employed, and to provide for correcting any defect which may develop after the joint has been in use without breaking the joint.

Other objects of our invention will hereinafter appear and to these ends our invention consists of a pipe joint embodying the features of construction, combination of elements, and arrangement of parts, substantially as hereinafter described and set forth in the drawing which is a longitudinal section of a pipe joint embodying the invention.

In the drawing (*a*) represents the pipes and (*b*) flanges the interior surfaces of which are formed cylindrical for short portions of the length of the flanges as at (*c*) and (*d*) of diameters equal to the external diameter of the pipe (*a*) and concave as at (*e*) between the cylindrical portions for the greater portion of the length of the flange.

(*f*) represents convex portions formed upon the pipe after the flanges have been placed in position to completely fill and bring the outer surfaces of the pipe into very intimate contact at all points with the concave surfaces of the interior of the flange. The end surfaces of the pipes are in contact at (*g*) and the faces of the flanges are in contact at (*h*).

(*i*) represents the packing or gasket.

(*k*) and (*l*) are, respectively, bolts and nuts for securing the flanges together.

(*m*) represents an enlarged bolt hole in one flange, and (*n*) a bushing made to fit closely around the bolt (*k*) and into the enlarged hole (*m*).

(*o*) represents enlargements of the bolt holes on the face sides of the flanges to provide space into which any excess of the packing material may flow as indicated at (*p*), when pressure is brought upon it by setting up on the bolts and nuts securing the flanges.

The convex surfaces (*e*) are made symmetrical about the plane indicated by (X X,) which plane is at right angles to the axis of the pipe, and the faces of the flanges (*b*) are made parallel to this plane (X X).

Each flange is secured to the pipe before the pipe is placed in position by placing the flange upon the pipe (*m*) and then expanding or stretching at (*f*) the material of the pipe so that the exterior of the pipe is brought into intimate contact with the interior of the flange over the whole of the convex surfaces of the flange. In this way a perfect joint is formed between the interior of the flange and the exterior of the pipe, and the material of either the pipe or the flange, which would require to be sheared before the pipe could be withdrawn from the flange along surfaces indicated by (Y Y) in the figure, is so great as to prevent withdrawal of the pipe from the flange even though very heavy stresses tending to withdraw the pipe should be brought upon the joint. Since the concave surfaces of the interior of the flange are symmetrical about the plane (X X), which plane is perpendicular to the axis of the pipe and parallel to the face of the flange, a process of expanding the pipe into the flange automatically brings the face of the flange perpendicular to the axis of the pipe so that when the two flanges forming the joint are brought together the axes of the two pieces of pipe to be joined will coincide. The ends of the pipe, after the flanges have been secured, may be faced off true with the faces of the flange, so that when the joint is made up the ends of the pipe are in intimate contact with one another and a metal to metal joint formed by the ends of the pipe bearing upon one another. The faces of the flanges instead of being formed in one plane so that they will bear over the entire surfaces upon one another, are formed with circumferential plane surfaces (*h*) at the outer and inner edges of the flanges, which surfaces bear upon one another when the flanges are in position, and leave between the flanges an intermediate flat annular space to receive the gasket or packing material (*i*), and in this way the gasket or packing material is retained in a fully closed space and the edges of the gasket protected.

For gasket or packing material any suitable compressible material may be employed, though we prefer to use a metallic material such, for example, as lead in which some flow may be produced by the exercise of considerable pressure. This gasket when placed before the joint is fully set up, is constructed thicker than the thickness of the annular space left between the contacting portions (*h*) of the flanges when the joint is made up, and as pressure is brought upon the gasket or packing material in setting up the bolts and nuts securing the flanges, the flow of the metallic gasket is produced so that the whole of the flat annular space is filled by the metallic gasket and the excess of material forced into the spaces (*o*) provided for this purpose around the bolt holes on the face sides of the flanges as indicated at (*p*). In this way, when the joint is made up, the ends of the pipe at the joint are in contact with one another at (*g*) and the faces of the flanges are also in contact with one another at the surfaces (*h*) at the inside edges of the flanges, and the packing material is forced into intimate contact with both flanges and portions of the bolts so that the packing or gasket prevents entirely the escape of fluid, for the transmission of which the pipes are employed, through the joint. Forming the surfaces of the interior of the flanges in accordance with our invention and expanding the pipes into contact with the convex interior surfaces of the flanges prevents any escape of fluid between a flange and the pipe should the contact of the plane ends of the pipe be such as to permit leakage at this point. It is possible in this way to produce a joint which may be employed with fluids at very high temperature such, for example, as highly superheated steam, and at high pressure, which will be perfectly tight under all conditions.

To provide for correcting any defects in tightness which may develop after the joint has been made up, one or more of the bolt holes for the flange is made large as indicated at (*m*) and there is fitted around the bolt and into this enlarged hole a bushing (*n*) the flange end of which acts as a washer for the nut. Should then the compressible packing material not have filled all of the space to make a tight joint between the flange faces, additional packing material may be placed in the annular space surrounding the bolt and the bushing replaced.

Upon setting up the nut (*l*) bearing upon this bushing, the compressible material is forced into the joint and further flow of the packing material produced to make this material flow into all of the spaces and come into intimate contact with the flange faces so as to form a perfectly tight joint. This may be done at any time so that should leaks develop after the joint has been in service, any defect in tightness of the joint may be corrected without breaking and renewing the joint.

Obviously, some features of this invention may be used without others, and the invention may be embodied in widely varying forms; therefore, without limiting our invention to the construction shown or described, or enumerating equivalents,

What we claim and desire by Letters Patent is,—

1. In a pipe joint, the combination of two pipe sections with a flange secured to the end of each section, said flanges and pipe sections being adapted to fit against each other end to end, forming a metal joint, each flange being provided with a complete shallow internal concave surface extending over the greater portion of the length of the flange as it fits on the pipe section, said surfaces being constructed as surfaces of revolution about an axis perpendicular to the faces of said flanges, and said pipe sections each having an external surface expanded into intimate contact with the circumferential concave surface of the corresponding flange to form a fluid-tight joint between the pipe section and the corresponding flange, and to secure said flange upon said pipe section with its face perpendicular to the axis of said pipe, substantially as described.

2. A pipe joint, including two pipe sections with a flange secured to the end of each section said flanges being adapted to fit against each other, each flange being provided with a complete, shallow, internal concave surface extending over the greater portion of the length of the flange as it fits on the pipe section, symmetrical about an axis perpendicular to the face of said flange and perpendicular to the axis of the corresponding pipe section, and said pipe sections each having an external surface expanded into intimate contact with the circumferential concave surface of the corresponding flange to form a fluid tight joint between the pipe section and the corresponding flange, and means for securing said flanges together.

3. A pipe joint, including, in combination, a pipe section and a flange provided with a complete, shallow, internal, concave surface extending over the greater portion of the length of said flange as it fits on the pipe section, said pipe section having an external surface expanded into intimate contact with the circumferential concave surface of said flange to make a fluid-tight joint between said pipe section and said flange.

4. In a pipe joint, the combination of two pipe sections, a flange secured to each of said pipe sections, said flanges being provided with a recess on the ends thereof for the reception of a gasket, each of said flanges, where it is secured to the corresponding pipe section being provided with a shallow, internal, concave surface extending around the entire circumference and for the greater portion of the length of said flange as it fits on the pipe section, and symmetrical about an axis perpendicular to the axis of the corresponding pipe section, and said pipe section having its external surface around the entire circumference thereof, expanded so as to closely fit into the concave surface of the corresponding flange, thereby forming a fluid tight joint, and means for securing said flanges together, substantially as described.

5. In a pipe joint, the combination of two pipe sections adapted to fit against each other end to end, a flange secured to the ends of each of said pipe sections, each of said flanges having a flat, internal face interrupted by a shallow gasket space, said flanges being adapted to fit against each other both inside and outside of said gasket space, forming a metal to metal joint, each of said flanges being provided with a shallow, internal concave surface extending around the entire circumference and for the greater portion of the length of said flange as it fits on the pipe section and symmetrical about an axis perpendicular to the axis of the pipe section, and each of said pipe sections having near its end a convex surface expanded out into intimate contact, along its entire circumference, with the concave surface of the corresponding flange, a gasket between said flanges, and means for securing said flanges together, substantially as described.

6. In a pipe joint, the combination of two pipe sections adapted to fit against each other end to end, a flange secured to each of said pipe sections at its end, the ends of said flanges being each provided with a gasket space and adapted to fit closely against each other, both inside and outside of said gasket space, said flanges being provided at intervals with surplus material spaces opening into said gasket space, a metallic gasket adapted to flow under heavy pressure, filling said gasket space, and means for securing said flanges together and causing said gasket to flow and fill the gasket space and portions of the surplus material spaces, substantially as described.

7. A pipe joint, including in combination with two pipe sections, two flanges secured to the ends of said pipe sections, a compressible gasket contacting with surfaces of said flanges, and means whereby additional compressible material may be added to said gasket to increase the fluid tightness of the contacting of said gasket with said flanges after said joint has been made up, substantially as described.

8. In a pipe joint, the combination of two pipe sections, a flange secured to the end of each of said sections, the ends of said flanges being adapted to fit against each other but cut away so as to leave a flattened annular space, compressible packing material within said annular space, bolts and nuts for securing said flanges together, said flanges being provided with perforations through which said bolts may pass, and the perforations being at some points larger than the bolts, and washers adapted to fit around said bolts and into the openings in one of said flanges, substantially as described.

9. A pipe joint comprising two pipe sections adapted to fit against each other end to end, a flange secured to the end of each of said pipe sections, said flange being provided with a shallow internal groove extending around its entire circumference, and the corresponding pipe section being expanded to fit into said groove, said flanges being adapted to fit against each other end to end, but cut away so as to leave a flattened annular space between them, bolts and nuts for securing said flanges together, one of said flanges being provided with perforations larger than said bolts, and the other of said flanges being provided with perforations into which said bolts exactly fit, said perforations being enlarged on one side, compressible packing material introduced into said flattened annular space, and a cylindrical washer for each bolt adapted to fit within the corresponding perforation in one of said flanges, substantially as described.

10. A pipe joint, including, in combination, two flanges, each provided with a complete, shallow, internal, concave surface extending over the entire circumference and the greater portion of the length of the flange, with an external circumferential surface of a pipe section expanded into intimate contact with the interior concave surface of said flange to form a fluid-tight joint, and a gasket between said flanges.

In testimony whereof we have signed this specification in the presence of two subscribing witnesses.

H. G. GILLMOR.
W. R. HAYSOM.

In presence of—
Joseph W. Wilkins,
Geo. A. Kline.